(12) United States Patent
Siddiqui et al.

(10) Patent No.: US 10,600,104 B2
(45) Date of Patent: Mar. 24, 2020

(54) SYSTEMS AND METHODS FOR DETERMINING PRODUCT SEARCH RESULTS BASED ON PRODUCT ATTRIBUTE SCORES

(71) Applicant: WAL-MART STORES, INC., Bentonville, AR (US)

(72) Inventors: Omar Saeed Siddiqui, Sunnyvale, CA (US); Abilash Amarthaluri, San Jose, CA (US); George Roumeliotis, Menlo Park, CA (US); Chandni Jain, Santa Clara, CA (US); Zuzar Fakhruddin Nafar, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 279 days.

(21) Appl. No.: 15/605,733

(22) Filed: May 25, 2017

(65) Prior Publication Data
US 2018/0342003 A1 Nov. 29, 2018

(51) Int. Cl.
*G06Q 30/00* (2012.01)
*G06Q 30/06* (2012.01)
*G06F 16/951* (2019.01)

(52) U.S. Cl.
CPC ....... *G06Q 30/0627* (2013.01); *G06F 16/951* (2019.01)

(58) Field of Classification Search
CPC .............................................. G06Q 30/06–08
USPC ................................................ 705/26.1–27.2
See application file for complete search history.

(56) References Cited

U.S. PATENT DOCUMENTS

| 2009/0132345 A1 | 5/2009 | Meyssami et al. |
| 2010/0281023 A1 | 11/2010 | Chevalier et al. |
| 2012/0290441 A1* | 11/2012 | Mahaniok ................. G06F 8/60 705/26.62 |
| 2017/0262925 A1* | 9/2017 | Rangasamy Kannadasan ............ G06Q 30/0633 |

* cited by examiner

*Primary Examiner* — Ethan D Civan
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving search queries from users, coordinating displaying of search results for the search queries, receiving an indication that the users selected products in the search results, associating each search query with a product type based on products selected by the users, identifying product attributes in each search query, determining an attribute weight for each product attribute for the product type, determining which product attributes are recorded in product information for each product, determining a product attribute score for each product, receiving an additional search query, and selecting a first portion of products for display in additional search results for the additional search query.

20 Claims, 5 Drawing Sheets

SYSTEMS AND METHODS FOR DETERMINING PRODUCT SEARCH RESULTS BASED ON PRODUCT ATTRIBUTE SCORES

TECHNICAL FIELD

This disclosure relates generally to using product attribute scores to determine product search results to an online search query.

BACKGROUND

Data catalogs for online retailers can include product information for millions of products sold by the online retailer. The product information for each product sold by the online retailer can include tens or even hundreds of product attributes relating to the product. Thus, it is an expensive and time consuming process for the online retailer to collect information about the usefulness of product attributes in the product information for each product in the data catalog. This inability to collect information about the usefulness of product attributes for products results in less relevant or inadequate search results for online search queries for products on the website of the online retailer.

BRIEF DESCRIPTION OF THE DRAWINGS

To facilitate further description of the embodiments, the following drawings are provided in which.

Figure 1:
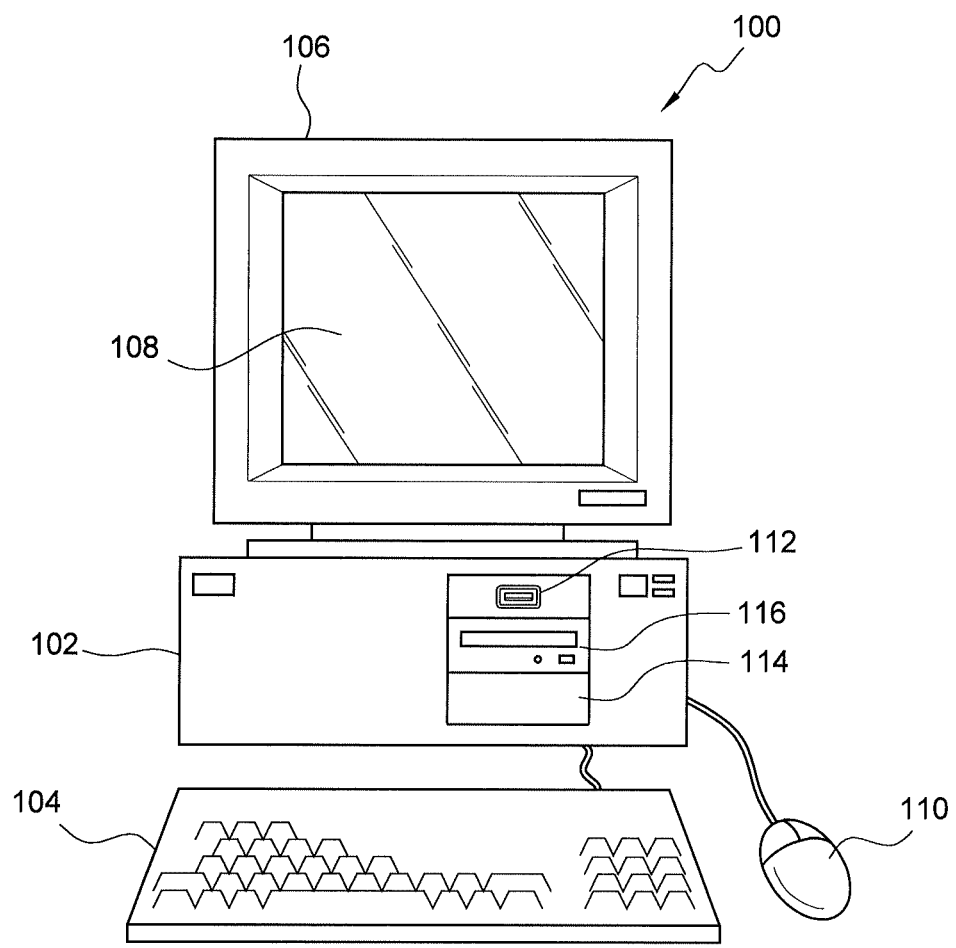
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of search queries from one or more users. The one or more storage modules can be further configured to run on the one or more processing modules and perform an act of coordinating displaying of search results for each search query of the plurality of search queries. The search results for each search query of the plurality of search queries can comprise at least one of a plurality of products. The one or more storage modules can be further configured to run on the one or more processing modules and perform an act of receiving an indication that the one or more users selected one or more products of the plurality of products in the search results for each search query of the plurality of search queries. The one or more storage modules can be further configured to run on the one or more processing modules and perform an act of associating each search query of the plurality of search queries with a product type based on the one or more products of the plurality of products selected by the one or more users in the search results. The one or more storage modules can be further configured to run on the one or more processing modules and perform an act of identifying one or more product attributes of a plurality of product attributes in each search query of the plurality of search queries. The one or more storage modules can be further configured to run on the one or more processing modules and perform an act of determining an attribute weight for each product attribute of the plurality of product attributes for the product type based on a total number of times each product attribute of the plurality of product attributes was identified in each search query of the plurality of search queries. The one or more storage modules can be further configured to run on the one or more processing modules and perform an act of determining which product attributes of the plurality of product attributes are recorded in product information for each product of the plurality of products. The one or more storage modules can be further configured to run on the one or more processing modules and perform an act of determining a product attribute score for each product of the plurality of products by combining the attribute weight for all product attributes of the plurality of product attributes recorded in the product information for each product of the plurality of products. The one or more storage modules can be further configured to run on the one or more processing modules and perform an act of receiving an additional search query. The one or more storage modules can be further configured to run on the one or more processing modules and perform an act of selecting a first portion of the plurality of products for display in additional search results for the additional search query. The product attribute score of each product of the first portion of the plurality of products can be higher than the product attribute score for each product of a second portion of the plurality of products not selected for display in the additional search results for the search query. The one or more storage modules can be further configured to run on the one or more processing modules and perform an act of coordinating displaying of the first portion of the plurality of products in the additional search results.

Various embodiments include a method. The method can include receiving a plurality of search queries from one or more users. The method also can include coordinating displaying of search results for each search query of the plurality of search queries. The search results for each search query of the plurality of search queries can comprise at least one of a plurality of products. The method also can include receiving an indication that the one or more users selected one or more products of the plurality of products in the search results for each search query of the plurality of search queries. The method also can include associating each search query of the plurality of search queries with a product type based on the one or more products of the plurality of products selected by the one or more users in the search results. The method also can include identifying one or more product attributes of a plurality of product attributes in each search query of the plurality of search queries. The method also can include determining an attribute weight for each product attribute of the plurality of product attributes for the product type based on a total number of times each product attribute of the plurality of product attributes was identified in each search query of the plurality of search queries. The method also can include determining which product attributes of the plurality of product attributes are recorded in product information for each product of the plurality of products. The method also can include determining a product attribute score for each product of the plurality of products by combining the attribute weight for all product attributes of the plurality of product attributes recorded in the product information for each product of the plurality of products. The method also can include receiving an additional search query. The method also can include selecting a first portion of the plurality of products for display in additional search results for the additional search query. The product attribute score of each product of the first portion of the plurality of products is higher than the product attribute score for each product of a second portion of the plurality of products not selected for display in the additional search results for the search query. The method also can include coordinating displaying of the first portion of the plurality of products in the additional search results.

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of search queries from one or more users. The one or more storage modules can be further configured to run on the one or more processing modules and perform an act of coordinating displaying of search results for each search query of the plurality of search queries, the search results for each search query of the plurality of search queries comprising at least one of a plurality of products. The one or more storage modules can be configured to run on the one or more processing modules and perform an act of receiving an indication that the one or more users selected one or more products of the plurality of products in the search results for each search query of the plurality of search queries. The one or more storage modules can be configured to run on the one or more processing modules and perform an act of associating each search query of the plurality of search queries with a product type based on the one or more products of the plurality of products selected by the one or more users in the search results. The one or more storage modules can be configured to run on the one or more processing modules and perform an act of identifying one or more product attributes of a plurality of product attributes in each search query of the plurality of search queries. The one or more storage modules can be configured to run on the one or more processing modules and perform an act of determining an attribute weight for each product attribute of the plurality of product attributes for the product type based on a total number of times each product attribute of the plurality of product attributes was identified in each search query of the plurality of search queries. The one or more storage modules can be configured to run on the one or more processing modules and perform an act of determining which product attributes of the plurality of product attributes are recorded in product information for each product of the plurality of products. The one or more storage modules can be configured to run on the one or more processing modules and perform an act of determining a product attribute score for each product of the plurality of products by combining the attribute weight for all product attributes of the plurality of product attributes recorded in the product information for each product of the plurality of products. The one or more storage modules can be configured to run on the one or more processing modules and perform an act of ranking the plurality of product attributes from a largest attribute weight to a smallest attribute weight based on the attribute weight for each product attribute of the plurality of product attributes. The one or more storage modules can be configured to run on the one or more processing modules and perform an act of coordinating displaying of a portion of the plurality of product attributes as ranked on a first webpage with a plurality of unique attributes displayed with each product attribute of the portion of the plurality of product attributes, wherein selection of one or more of the plurality of unique attributes on the first webpage filters a first portion of the plurality of products displayed on the first webpage.

Figure 2:
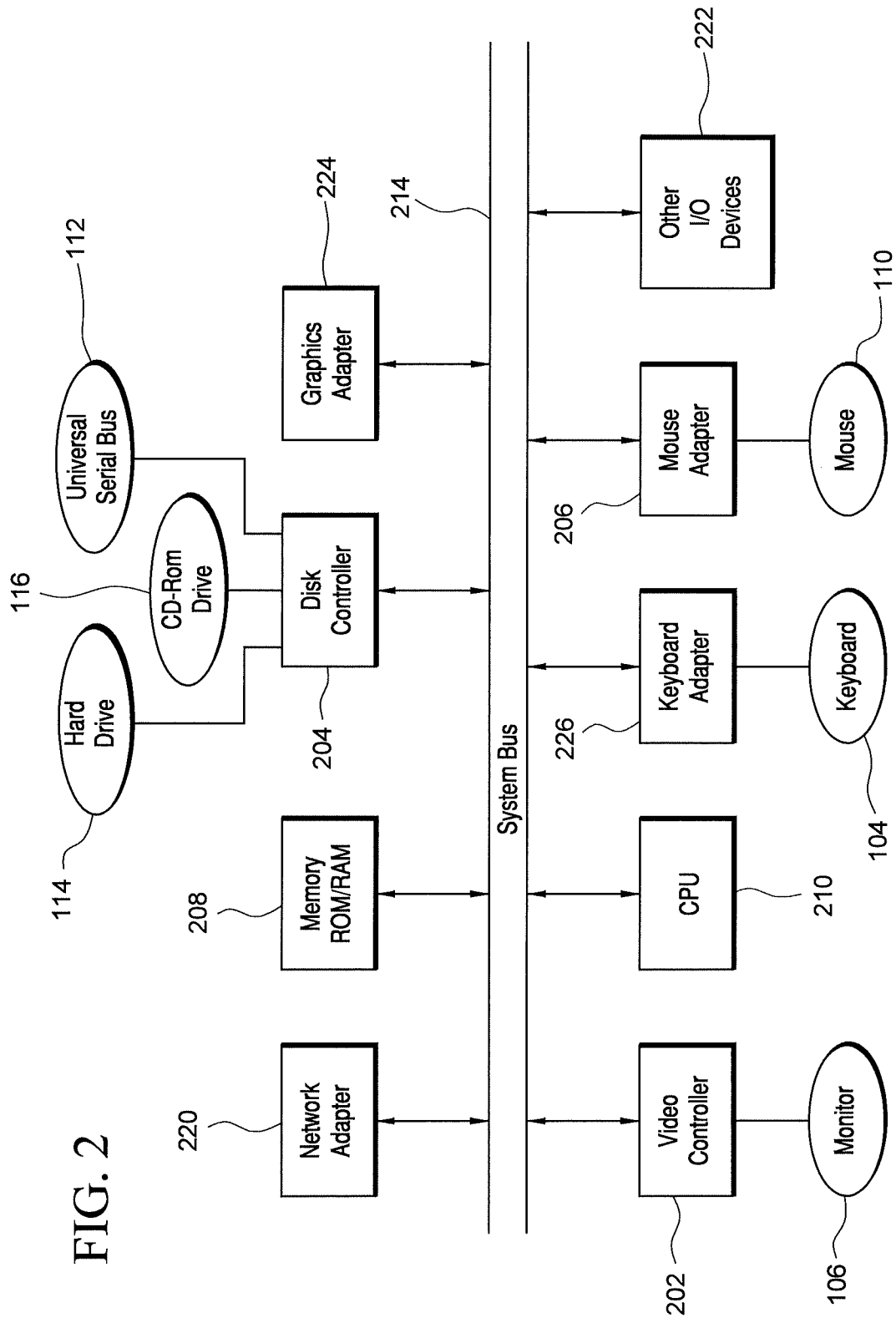
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), a hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
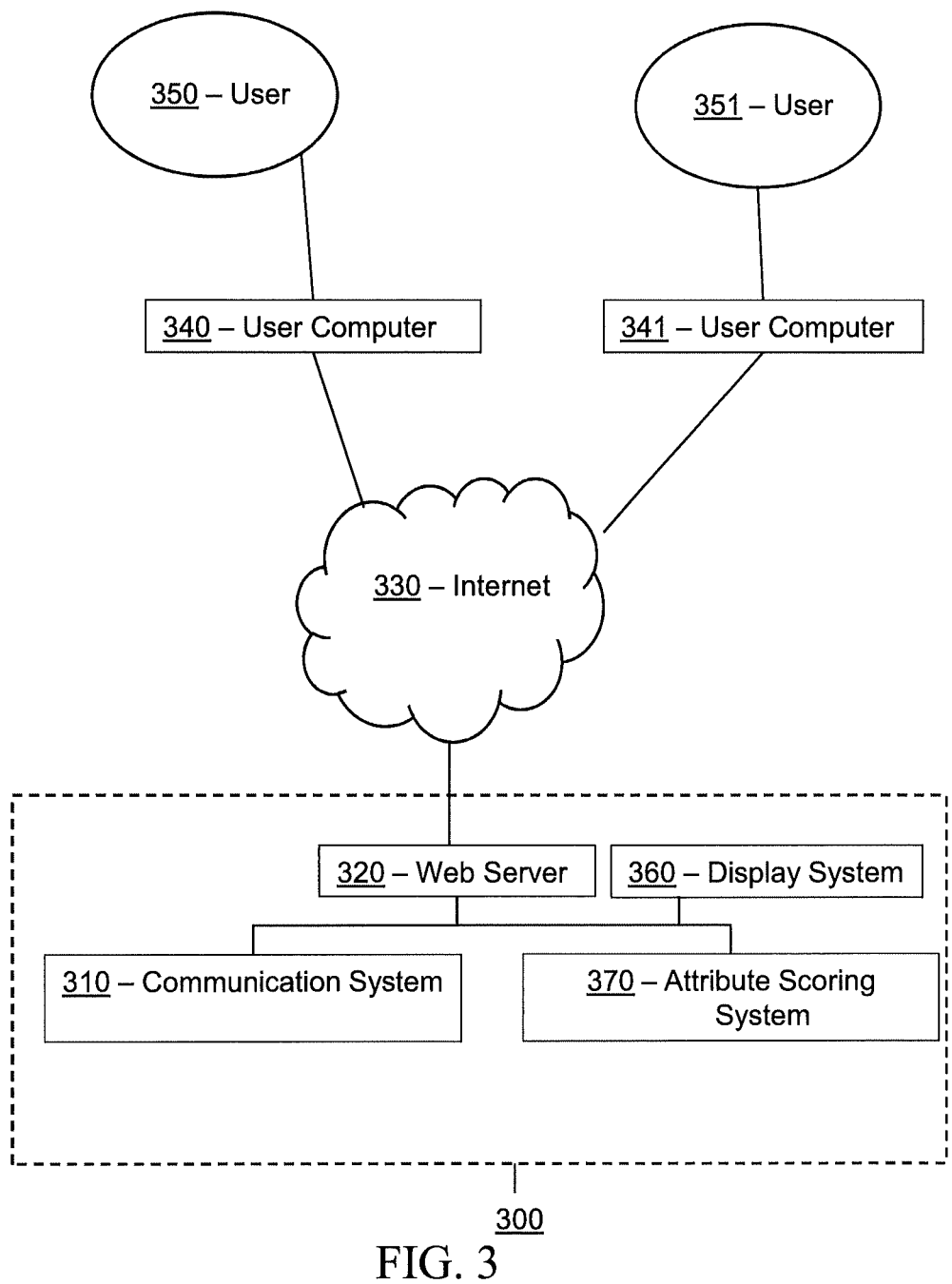
FIG. 3 illustrates a representative block diagram of a system, according to an embodiment.

Turning ahead in the drawings, FIG. 3 illustrates a block diagram of a system 300 that can be employed for determining product search results based on product attribute scores, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and an attribute scoring system 370. Communication system 310, web server 320, display system 360, and attribute scoring system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and attribute scoring system 370. Additional details regarding communication system 310, web server 320, display system 360, and attribute scoring system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, communication system 310, web server 320, display system 360, and/or attribute scoring system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or attribute scoring system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or attribute scoring system 370. In a similar manner, the processing module(s) and the memory storage module(s) can be local and/or remote to each other.

In many embodiments, communication system 310, web server 320, display system 360, and/or attribute scoring system 370 can be configured to communicate with one or more user computers 340 and 341. In some embodiments, user computers 340 and 341 also can be referred to as customer computers. In some embodiments, communication system 310, web server 320, display system 360, and/or attribute scoring system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or attribute scoring system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or attribute scoring system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, attribute scoring system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
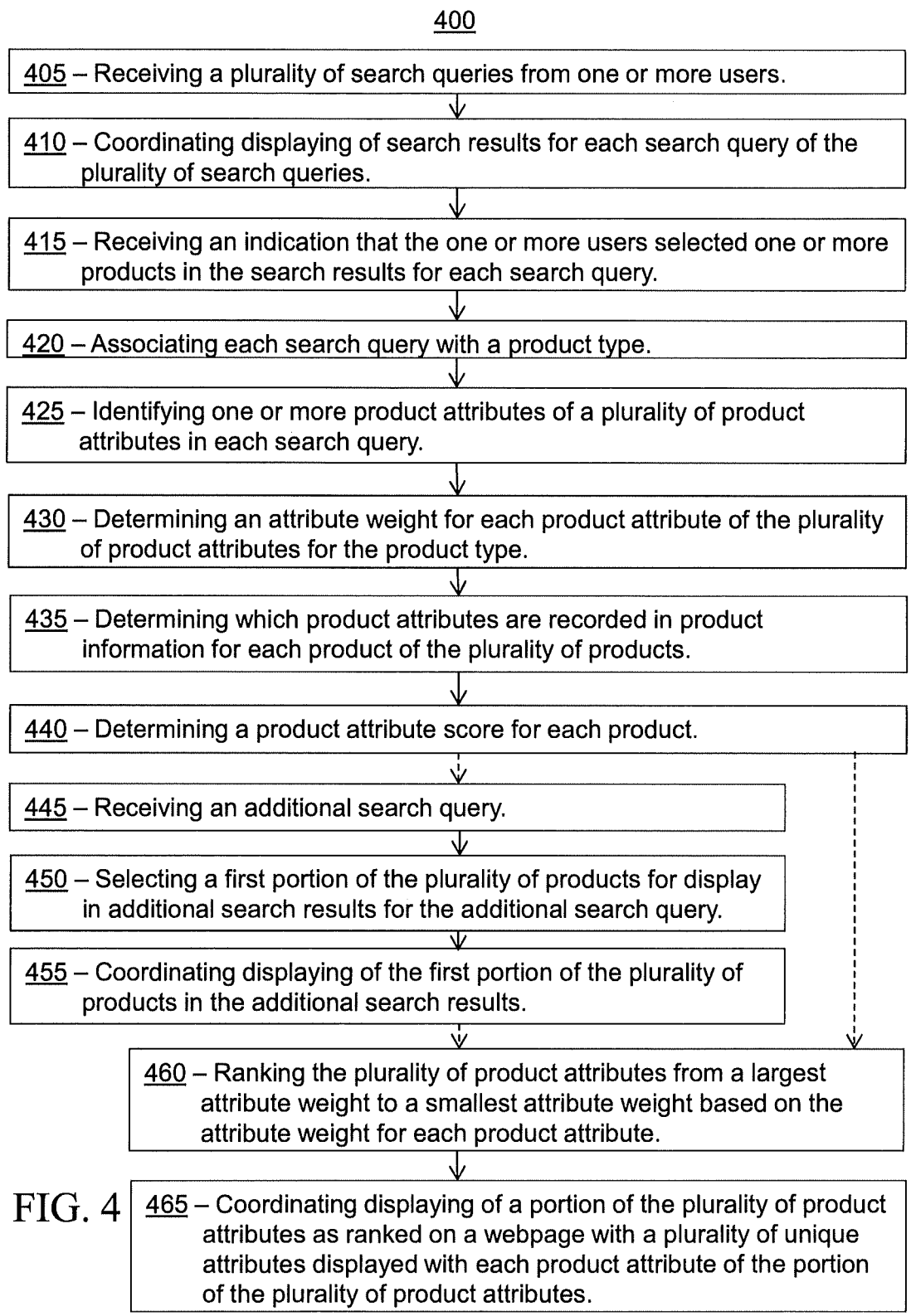
FIG. 4 is a flowchart for a method, according to certain embodiments.
Figure 5:
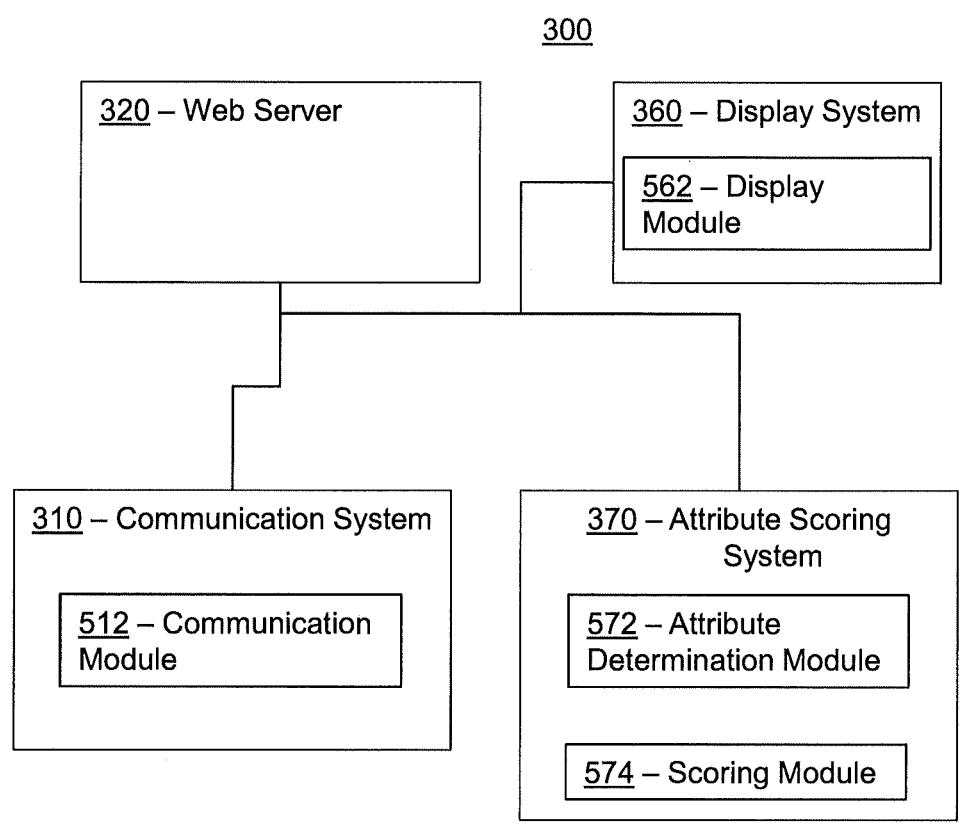
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360, and/or attribute scoring system 370 (FIGS. 3 & 5). The processing module(s) can be similar or identical to the processing module(s) described above with respect to computer system 100 (FIG. 1).

Data catalogs for online retailers can include product information for millions of products sold by the online retailer. The product information for each product sold by the online retailer can include tens or even hundreds of product attributes relating to the product. Thus, it is an expensive and time consuming process for the online retailer to collect information about the usefulness of product attributes in the product information for each product in the data catalog. This inability to collect information about the usefulness of product attributes for products results in less relevant or inadequate search results for online search queries for products on the website of the online retailer. Various implementations of method 400 solve this technological problem of returning relevant and adequate search results for an online search query by determining attribute scores for each product type. The attribute scores can be based on search queries and subsequent selections of products in the search results to the online queries. It is noted that while reference is made herein to an online retailer, the online retailer can comprise a retailer that is exclusively an online retailer or a retailer comprising an online website and one or more brick and mortar stores.

Method 400 can comprise an activity 405 of receiving a plurality of search queries from one or more users. The search queries can be entered into a website of the online retailer and/or a search engine website. The search queries can comprise one or more words related to one or more products in which the users are interested. For example, a user can enter "red men's Nike sneaker" into a search query.

Next, method 400 can comprise an activity 410 of coordinating displaying of search results for each search query of the plurality of search queries. The search results for each search query of the plurality of search queries can comprise at least one of a plurality of products. Next, method 400 can comprise an activity 415 of receiving an indication that the one or more users selected one or more products of the plurality of products in the search results for each search query of the plurality of search queries.

Next, method 400 can comprise organizing the plurality of search queries by segmenting the plurality of search queries by product time. Thus, method 400 can comprise an activity 420 of associating each search query with a product type. The associating or otherwise inferring of each search query of the plurality of search queries with the product type can be based on the one or more products of the plurality of products selected by the users in the search results. For example, after a user entered "red men's Nike sneaker" as a search query and then selected a certain athletic shoe displayed in the search results, system 300 (FIG. 3) can associate or infer the search query entered by the user with a product type of "athletic shoe." In many embodiments, the online retailer can associate the search query with one of a plurality of predetermined product types. Predetermined product types can include but are not limited to categories or subcategories of products available on the website of the online retailer. In other embodiments, the plurality of search queries can be organized based on any type of product classification.

Once the search query has been related to a product type, the strings in each search query can be parsed and mapped to one or more product attributes. Thus, system 300 (FIG. 3) can analyze the search query to identify one or more product attributes that are mentioned in the search query. Returning to FIG. 4, method 400 next can comprise an activity 425 of identifying one or more product attributes of a plurality of product attributes in each search query. Activity 425 can, in many embodiments, include use a title interpretation algorithm to identify the one or more product attributes in each search query. The product attributes identified in the search query are associated with the product type based on the product selected by the user. For example, if a user entered "red men's Nike sneaker" as a search query and then selected a certain type of athletic shoe in the search results, the following product attributes are identified and associated with the product type: (1) a "color" product attribute for the term "red" in the search query; (2) a "gender" product attribute for the term "men's" in the search query; and (3) a "brand" product attribute for the term "Nike" in the search query.

In some embodiments, activity 425 can comprise an activity of matching strings within each search query against: one or more product attributes of the product; a brand product line dictionary from taxonomy; target values sorted by co-occurring counts of attribute and product type; and/or regex matches based on curated normalization value regex rules. Apart from an exact match, fuzzy matching using an optimized Jaro Winkler similarity metric can be used to match strings with each search query against the list above. In some embodiments, Aho Corasick Tries can be used for interpreting multiple entities in linear time.

As strings from the plurality of search queries are parsed and mapped to product attributes, a running count for each attribute can be maintained to understand how many times strings from the plurality of search queries have been mapped to a particular product attribute. For each product attribute occurring in search queries related to a product type, the number of such occurrences can be counted and stored, by product attribute in separate variables. For any product type, a set of variables can be created that correspond to each attribute observed for that product type. Each attribute can be assigned a variable $\alpha_i \ldots \alpha_n$, where n is the number of attributes observed in the search queries of that product type. The count for the number of observances for each product attribute can be maintained by the variables $\alpha_i \ldots \alpha_n$, where $\alpha_i$ exists for each product attribute that was observed for a plurality of search queries for a product type. In the example of sneakers, $\alpha_1$ would be a count for the number of occurrences of brand in search queries related to the sneakers, $\alpha_2$ would be a count for the number of occurrences of gender in search queries related to the sneakers, and $\alpha_3$ would be a count for the number of occurrences of color values in search queries related to the sneakers. Once all $\alpha_i$ for a product type have been tallied, a total number of occurrences of product attributes for any particular product type can be calculated by aggregating $\alpha_i \ldots \alpha_n$ and storing the sum in T. Thus $$T = \Sigma_1^n a_i$$

Thus, in some embodiments, method 400 can comprise an activity 430 of determining an attribute weight for each product attribute of the plurality of product attributes for the product type. Determining the attribute weight for each product attribute for the product type can be based on a total number of times each product attribute of the plurality of product attributes was identified in each search query of the plurality of search queries. For example purposes only, over a period of time, system 300 (FIG. 3) can determine that search queries associated with an "athletic shoe" product type mentioned a brand product attribute seven times, a gender product attribute three times, and a color product attribute two times. Thus, for the athletic shoe of this non-limiting example, the brand product attribute comprises a larger attribute weight than the attribute weights for a gender product attribute and a color product attribute. In many embodiments, activity 430 can further comprise an activity of normalizing the attribute weight for each product attribute of the plurality of product attributes for the product type such that a combined total of all attribute weights for the product type is equal to 1. For example, for athletic shoes in the example above, the brand attribute weight can be normalized to 0.58 (7/12=0.58), the gender attribute weight can be normalized to 0.25 (3/12=0.25), and the color attribute weight can be normalized to 0.17 (2/12=0.17).

In some embodiments, the number of any product attribute can be divided by T determine the importance of that product attribute in the plurality of search queries. For example, $$w_i(n) = \frac{a_n}{T}$$

where $w_i$ is an attribute weight, and $a_n$ is a particular product attribute.

Returning to FIG. 4, method 400 next can comprise an activity 435 of determining which product attributes are recorded in product information for each product of the plurality of products. More particularly, in some embodiments, system 300 (FIG. 3) can review the product information for each product in the data catalog for the online retailer and determine which product attributes of the plurality of product attributes are recorded in the product information for each product in the data catalog of the online retailer. Returning to the non-limiting example of the athletic shoe product type provided above, for each athletic shoe listed in the data catalog of the online retailer, system 300 (FIG. 3) can determine if the product information includes a brand product attribute, a gender product attribute, and/or a color product attribute.

In some embodiments, activity 435 can comprise using a distributed network comprising distributed memory architecture to determine which product attributes are recorded in product information for each product of the plurality of products. This distributed architecture can reduce the impact on the network and system resources to reduce congestion in bottlenecks while still allowing data to be accessible from a central location. In some embodiments determining which product attributes are recorded is performed while a user is shopping on a website of the online retailer, e.g., when a user enters a search query, browses categories of products, and/or sorts products. In some embodiments, determining which product attributes are recorded is performed when system 300 (FIG. 3) receives new items and/or on a daily or weekly basis.

Returning to FIG. 4, method 400 next can comprise an activity 440 of determining a product attribute score for each product. In some embodiments, the product attribute score for each product of the plurality of products can be determined by combining the attribute weight as normalized for all product attributes of the plurality of product attributes recorded in the product information for each product of the plurality of products. Returning to the non-limiting example of the athletic shoe product type provided above, if the product information for a particular athletic shoe product includes only a brand product attribute and a color product attribute, the product attribute score for that particular athletic shoe product would be 0.75. A product attribute score of 0.75 is determined from a normalized brand attribute weight of 0.58 plus a normalized color attribute weight of 0.17, as determined above. If a product has all of the attributes for a product type in the product information for the product, the product attribute score is 1.0.

After product attribute scores are determined, method 400 can optionally comprise an activity 445 of receiving an additional search query. The additional search query can be entered into the web site of the online retailer and/or a search engine website. The additional search query can comprise one or more words related to one or more products in which a user is interested.

The product attribute scores also can be used in determining which products should be returned in the search results for an additional search query. For example, products related to a search query but comprising a low product attribute score or missing product attributes related to the additional search query can be excluded from the search results. Thus, in some embodiments, method 400 next can optionally comprise an activity 450 of selecting a first portion of the plurality of products for display in additional search results for the additional search query. The product attribute score of each product of the first portion of the plurality of products can be higher than the product attribute score for each product of a second portion of the plurality of products not selected for display in the additional search results for the search query. In some embodiments, method 400 also can comprise an activity of ranking the first portion of the plurality of products from a highest product attribute score to a lowest product attribute score based on the product attribute score for each product of the first portion of the plurality of products.

In some embodiments, method 400 next can optionally comprise an activity 455 of coordinating displaying of the first portion of the plurality of products in the additional search results. In embodiments comprising the activity of ranking the first portion of the plurality of products from a highest product attribute score to a lowest product attribute score, activity 455 can comprise coordinating displaying of the first portion of the plurality of product as ranked in the additional search results.

In many embodiments, attribute weights for product types can be used to determine product attribute filters on the website of the online retailer. These product attribute filters can be displayed, by way of non-limiting example, on the left hand navigation of a webpage of the web site of the online retailer. To determine which product attributes are best to include as product attribute filters, in some embodiments, method 400 also can optionally comprise an activity 460 of ranking the plurality of product attributes from a largest attribute weight to a smallest attribute weight based on the attribute weight for each product attribute. Returning to the non-limiting example of the athletic shoe product type provided above, system 300 (FIG. 3) can rank the product attributes for athletic shoes as: first, brand; second, gender; and third, color.

Returning to FIG. 4, method 400 next can optionally comprise an activity 465 of coordinating displaying of a portion of the plurality of product attributes as ranked on a webpage with a plurality of unique attributes displayed with each product attribute of the portion of the plurality of product attributes. Selection of one or more of the plurality of unique attributes on the webpage can filter a portion of the plurality of products displayed on the webpage. Returning to the non-limiting example of the athletic shoe product type provided above, system 300 (FIG. 3) can coordinate displaying of: a brand product attribute filter list comprising a plurality of athletic shoe brand filters; a gender product attribute filter list comprising male and female filters; and a color product attribute filter list comprising a plurality of different color filters. When a user selects a certain filter, such as "female" in the gender product attribute filter list, system 300 (FIG. 3) filters the search results to include only female athletic shoes.

Product attribute scores also can be used for numerous other purposes on the website of the online retailer. For example, in some embodiments, method 400 also can comprise an activity of indicating a product of the plurality of products requires additional product attribute information in the product information for the product if the product attribute score of the product is below a predetermined threshold. Returning to the non-limiting example of the athletic shoe product type provided above, if a predetermined threshold for the product attribute score is 0.75, and a product information for a particular athletic shoe product includes only a gender product attribute (0.25 normalized attribute weight) and a color product attribute (0.17 normalized attribute weight) for a product attribute score of 0.42, system 300 (FIG. 3) can indicate the particular athletic shoe product requires additional product attribute information.

In some embodiments, method 400 also can comprise an activity of ranking the plurality of product attributes from a largest attribute weight to a smallest attribute weight based on the attribute weight for each product attribute of the plurality of product attributes. Returning to the non-limiting example of the athletic shoe product type provided above, attributes for athletic shoes can be ranked as: first, brand product attribute; second, gender product attribute; and third, color product attribute.

In some embodiments, method 400 also can comprise an activity of coordinating displaying of a webpage for a product of the plurality of products. The webpage for the product can comprise a highlighted product attribute for a product attribute of the plurality of product attributes for the product. In some embodiments, the highlighted product attribute for the product attribute can comprise a largest attribute weight relative to attribute weights of other product attributes of the plurality of product attributes for the product. Returning to the non-limiting example of the athletic shoe product type provided above, a brand product attribute of an athletic shoe product can be highlighted on the webpage of the athletic shoe product because the brand product attribute comprises a larger attribute weight than gender or color.

In some embodiments, method 400 also can comprise an activity of coordinating displaying of an information request webpage for a supplier of an additional product of the product type. The information request webpage can comprise the plurality of product attributes as ranked and an attribute entry field proximate each product attribute of the plurality of product attributes. Because information request pages for suppliers are often lengthy, suppliers often do not respond to each product attribute entry field. By including the highest ranked product attribute at the beginning of the information request webpage, the online retailer is more likely to collect the most important information from the supplier.

FIG. 5 illustrates a block diagram of a portion of system 300 comprising communication system 310, web server 320, display system 360, and/or attribute scoring system 370, according to the embodiment shown in FIG. 3. Each of communication system 310, web server 320, display system 360, and/or attribute scoring system 370 is merely exemplary and not limited to the embodiments presented herein. Each of communication system 310, web server 320, display system 360, and/or attribute scoring system 370 can be employed in many different embodiments or examples not specifically depicted or described herein. In some embodiments, certain elements or modules of communication system 310, web server 320, display system 360, and/or attribute scoring system 370 can perform various procedures, processes, and/or acts. In other embodiments, the procedures, processes, and/or acts can be performed by other suitable elements or modules.

In many embodiments, communication system 310 can comprise non-transitory memory storage module 512. Memory storage module 512 can be referred to as communication module 512. In many embodiments, communication module 512 can store computing instructions configured to run on one or more processing modules and perform one or more acts of method 400 (FIG. 4) (e.g., activity 405 of receiving a plurality of search queries from one or more users, activity 415 of receiving an indication that the one or more users selected one or more products in the search results for each search query, and activity 445 of receiving an additional search query (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 410 of coordinating displaying of search results for each search query of the plurality of search queries, activity 455 of coordinating displaying of the first portion of the plurality of products in the additional search results, and activity 465 of coordinating displaying of a portion of the plurality of product attributes as ranked on a webpage with a plurality of unique attributes displayed with each product attribute of the portion of the plurality of product attributes (FIG. 4)).

In many embodiments, attribute scoring system 370 also can comprise non-transitory memory storage module 572. Memory storage module 572 can be referred to as attribute determination module 572. In many embodiments, attribute determination module 572 can store computing instructions configured to run on one or more processing modules and perform one or more acts of method 400 (FIG. 4) (e.g., activity 420 of associating each search query with a product type and activity 425 of identifying one or more product attributes of a plurality of product attributes in each search query (FIG. 4)).

In many embodiments, attribute scoring system 370 also can comprise non-transitory memory storage module 574. Memory storage module 574 can be referred to as scoring module 574. In many embodiments, scoring module 574 can store computing instructions configured to run on one or more processing modules and perform one or more acts of method 400 (FIG. 4) (e.g., activity 430 of determining an attribute weight for each product attribute of the plurality of product attributes for the product type, activity 435 of determining which product attributes are recorded in product information for each product of the plurality of products, activity 440 of determining a product attribute score for each product, activity 450 of selecting a first portion of the plurality of products for display in additional search results for the additional search query, and activity 460 of ranking the plurality of product attributes from a largest attribute weight to a smallest attribute weight based on the attribute weight for each product attribute (FIG. 4)).

Although systems and methods for determining product search results based on product attribute scores have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform acts of:

receiving a plurality of search queries from one or more users;

coordinating displaying of respective search results for each respective search query of the plurality of search queries, the respective search results for each respective search query of the plurality of search queries comprising at least one respective product of a plurality of products;

receiving an indication that the one or more users selected one or more respective products of the plurality of products in the respective search results for each respective search query of the plurality of search queries;

associating each respective search query of the plurality of search queries with a respective product type based on the one or more respective products of the plurality of products selected by the one or more users in the respective search results;

identifying one or more respective product attributes of a plurality of product attributes in each respective search query of the plurality of search queries;

while the system is identifying the one or more respective product attributes of the plurality of product attributes:

maintaining, in real time, a count of a number of times each respective product attribute of the one or more respective product attributes of the plurality of product attributes are identified in the plurality of search queries;

determining a respective attribute weight for each respective product attribute of the plurality of product attributes for the respective product type based on the count of the number of times each respective product attribute of the plurality of product attributes was identified in each respective search query of the plurality of search queries;

determining which product attributes of the plurality of product attributes are recorded in respective product information for each respective product of the plurality of products;

determining a respective product attribute score for each respective product of the plurality of products by combining the respective attribute weight for all respective product attributes of the plurality of product attributes recorded in the respective product information for each respective product of the plurality of products;

receiving an additional search query;

selecting a first portion of the plurality of products for display in additional search results for the additional search query, wherein the respective product attribute score of each respective product of the first portion of the plurality of products is higher than the respective product attribute score for each respective product of a second portion of the plurality of products not selected for display in the additional search results for the additional search query; and coordinating displaying of the first portion of the plurality of products in the additional search results.

2. The system of claim 1, wherein:

the one or more non-transitory storage devices storing the computing instructions are further configured to run on the one or more processors and perform an act of normalizing the respective attribute weight for each respective product attribute of the plurality of product attributes for the respective product type such that a combined total of all respective attribute weights for the respective product type is equal to 1; and determining the respective product attribute score for each respective product of the plurality of products comprises determining the respective product attribute score for each respective product of the plurality of products by combining the respective attribute weight, as normalized, for all respective product attributes of the plurality of product attributes recorded in the respective product information for each respective product of the plurality of products.

3. The system of claim 2, wherein:

the one or more non-transitory storage devices storing the computing instructions are further configured to run on the one or more processors and perform an act of ranking the first portion of the plurality of products from a highest respective product attribute score to a lowest respective product attribute score based on the respective product attribute score for each respective product of the first portion of the plurality of products; and coordinating displaying of the first portion of the plurality of products in the additional search results comprises coordinating displaying of the first portion of the plurality of products, as ranked, in the additional search results.

4. The system of claim 2, wherein the one or more non-transitory storage devices storing the computing instructions are further configured to run on the one or more processors and perform an act of indicating a product of the plurality of products requires additional product attribute information in the respective product information for the product when the respective product attribute score of the product is below a predetermined threshold.

5. The system of claim 1, wherein the one or more non-transitory storage devices storing the computing instructions are further configured to run on the one or more processors and perform an act of coordinating displaying of a webpage for a product of the plurality of products, the webpage comprising a highlighted product attribute for a product attribute of the plurality of product attributes for the product, the highlighted product attribute for the product attribute comprising a largest respective attribute weight relative to respective attribute weights of other respective product attributes of the plurality of product attributes for the product.

6. The system of claim 1, wherein the one or more non-transitory storage devices storing the computing instructions are further configured to run on the one or more processors and perform acts of:

ranking the plurality of product attributes from a largest respective attribute weight to a smallest respective attribute weight based on the respective attribute weight for each product attribute of the plurality of product attributes; and coordinating displaying of a portion of the plurality of product attributes, as ranked, on a webpage with a respective plurality of unique attributes displayed with each respective product attribute of the portion of the plurality of product attributes, wherein selection of one or more unique attributes of the respective plurality of unique attributes on the webpage filters a third portion of the plurality of products displayed on the webpage.

7. The system of claim 1, wherein the one or more non-transitory storage devices storing the computing instructions are further configured to run on the one or more processors and perform acts of:

ranking the plurality of product attributes from a largest respective attribute weight to a smallest respective attribute weight based on the respective attribute weight for each respective product attribute of the plurality of product attributes; and coordinating displaying of an information request webpage for a supplier of an additional product of the respective product type, the information request webpage comprising the plurality of product attributes, as ranked, and a respective attribute entry field proximate each respective product attribute of the plurality of product attributes.

8. The system of claim 1, wherein:

the one or more non-transitory storage devices storing the computing instructions are further configured to run on the one or more processors and perform acts of:

normalizing the respective attribute weight for each respective product attribute of the plurality of product attributes for the respective product type such that a combined total of all respective attribute weights for the respective product type is equal to 1;

ranking the first portion of the plurality of products from a highest respective product attribute score to a lowest respective product attribute score based on the respective product attribute score for each respective product of the first portion of the plurality of products;

indicating a first product of the plurality of products requires additional product attribute information in the respective product information for the first product when the respective product attribute score of the first product is below a predetermined threshold;

coordinating displaying of a first webpage for a second product of the plurality of products, the first webpage comprising a highlighted product attribute for a product attribute of the plurality of product attributes for the second product, the highlighted product attribute for the product attribute comprising a largest respective attribute weight relative to respective attribute weights of other respective product attributes of the plurality of product attributes for the second product;

ranking the plurality of product attributes from a largest respective attribute weight to a smallest respective attribute weight based on the respective attribute weight for each respective product attribute of the plurality of product attributes;

coordinating displaying of a portion of the plurality of product attributes as ranked on a second webpage with a respective plurality of unique attributes displayed with each respective product attribute of the portion of the plurality of product attributes, wherein selection of one or more respective unique attributes of the respective plurality of unique attributes on the second webpage filters a third portion of the plurality of products displayed on the second webpage; and coordinating displaying of an information request webpage for a supplier of an additional product of the respective product type, the information request webpage comprising the plurality of product attributes, as ranked, and a respective attribute entry field proximate each respective product attribute of the plurality of product attributes;

determining the respective product attribute score for each respective product of the plurality of products comprises determining the respective product attribute score for each respective product of the plurality of products by combining the respective attribute weight as normalized, for all respective product attributes of the plurality of product attributes recorded in the respective product information for each respective product of the plurality of products; and coordinating displaying of the first portion of the plurality of products in the additional search results comprises coordinating displaying of the first portion of the plurality of products, as ranked, in the additional search results.

9. A method being implemented via execution of computing instructions configured to run at one or more processors and configured to be stored at non-transitory computer-readable media, the method comprising:

receiving a plurality of search queries from one or more users;

coordinating displaying of respective search results for each respective search query of the plurality of search queries, the respective search results for each respective search query of the plurality of search queries comprising at least one respective product of a plurality of products;

receiving an indication that the one or more users selected one or more respective products of the plurality of products in the respective search results for each respective search query of the plurality of search queries;

associating each respective search query of the plurality of search queries with a respective product type based on the one or more respective products of the plurality of products selected by the one or more users in the respective search results;

identifying one or more respective product attributes of a plurality of product attributes in each respective search query of the plurality of search queries;

while identifying the one or more respective product attributes of the plurality of product attributes:

maintaining, in real time, a count of a number of times each respective product attribute of the one or more respective product attributes of the plurality of product attributes are identified in the plurality of search queries;

determining a respective attribute weight for each respective product attribute of the plurality of product attributes for the respective product type based on a respective total number of times each respective product attribute of the plurality of product attributes was identified in each respective search query of the plurality of search queries;

determining which product attributes of the plurality of product attributes are recorded in respective product information for each respective product of the plurality of products;

determining a respective product attribute score for each respective product of the plurality of products by combining the respective attribute weight for all respective product attributes of the plurality of product attributes recorded in the respective product information for each respective product of the plurality of products;

receiving an additional search query;

selecting a first portion of the plurality of products for display in additional search results for the additional search query, wherein the respective product attribute score of each respective product of the first portion of the plurality of products is higher than the respective product attribute score for each respective product of a second portion of the plurality of products not selected for display in the additional search results for the additional search query; and coordinating displaying of the first portion of the plurality of products in the additional search results.

10. The method of claim 9, wherein:

the method further comprises normalizing the respective attribute weight for each respective product attribute of the plurality of product attributes for the respective product type such that a combined total of all respective attribute weights for the respective product type is equal to 1; and determining the respective product attribute score for each respective product of the plurality of products comprises determining the respective product attribute score for each respective product of the plurality of products by combining the respective attribute weight, as normalized, for all respective product attributes of the plurality of product attributes recorded in the respective product information for each respective product of the plurality of products.

11. The method of claim 10, wherein:

the method further comprises ranking the first portion of the plurality of products from a highest respective product attribute score to a lowest respective product attribute score based on the respective product attribute score for each respective product of the first portion of the plurality of products; and coordinating displaying of the first portion of the plurality of products in the additional search results comprises coordinating displaying of the first portion of the plurality of products, as ranked, in the additional search results.

12. The method of claim 10, wherein the method further comprises indicating a product of the plurality of products requires additional product attribute information in the respective product information for the product when the respective product attribute score of the product is below a predetermined threshold.

13. The method of claim 9, wherein the method further comprises coordinating displaying of a webpage for a product of the plurality of products, the webpage comprising a highlighted product attribute for a product attribute of the plurality of product attributes for the product, the highlighted product attribute for the product attribute comprising a largest respective attribute weight relative to respective attribute weights of other respective product attributes of the plurality of product attributes for the product.

14. The method of claim 9, wherein the method further comprises:

ranking the plurality of product attributes from a largest respective attribute weight to a smallest respective attribute weight based on the respective attribute weight for each product attribute of the plurality of product attributes; and coordinating displaying of a portion of the plurality of product attributes, as ranked, on a webpage with a respective plurality of unique attributes displayed with each respective product attribute of the portion of the plurality of product attributes, wherein selection of one or more unique attributes of the respective plurality of unique attributes on the webpage filters a third portion of the plurality of products displayed on the webpage.

15. The method of claim 9, wherein the method further comprises:

ranking the plurality of product attributes from a largest respective attribute weight to a smallest respective attribute weight based on the respective attribute weight for each respective product attribute of the plurality of product attributes; and coordinating displaying of an information request webpage for a supplier of an additional product of the respective product type, the information request webpage comprising the plurality of product attributes, as ranked, and a respective attribute entry field proximate each respective product attribute of the plurality of product attributes.

16. The method of claim 9, wherein:

the method further comprises:

normalizing the respective attribute weight for each respective product attribute of the plurality of product attributes for the respective product type such that a combined total of all respective attribute weights for the respective product type is equal to 1;

ranking the first portion of the plurality of products from a highest respective product attribute score to a lowest respective product attribute score based on the respective product attribute score for each respective product of the first portion of the plurality of products;

indicating a first product of the plurality of products requires additional product attribute information in the respective product information for the first product when the respective product attribute score of the first product is below a predetermined threshold;

coordinating displaying of a first webpage for a second product of the plurality of products, the first webpage comprising a highlighted product attribute for a product attribute of the plurality of product attributes for the second product, the highlighted product attribute for the product attribute comprising a largest respective attribute weight relative to respective attribute weights of other respective product attributes of the plurality of product attributes for the second product;

ranking the plurality of product attributes from a largest respective attribute weight to a smallest respective attribute weight based on the respective attribute weight for each respective product attribute of the plurality of product attributes;

coordinating displaying of a portion of the plurality of product attributes as ranked on a second webpage with a respective plurality of unique attributes displayed with each respective product attribute of the portion of the plurality of product attributes, wherein selection of one or more respective unique attributes of the respective plurality of unique attributes on the second webpage filters a third portion of the plurality of products displayed on the second webpage; and coordinating displaying of an information request webpage for a supplier of an additional product of the respective product type, the information request webpage comprising the plurality of product attributes, as ranked, and a respective attribute entry field proximate each respective product attribute of the plurality of product attributes;

determining the respective product attribute score for each respective product of the plurality of products comprises determining the respective product attribute score for each respective product of the plurality of products by combining the respective attribute weight as normalized, for all respective product attributes of the plurality of product attributes recorded in the respective product information for each respective product of the plurality of products; and coordinating displaying of the first portion of the plurality of products in the additional search results comprises coordinating displaying of the first portion of the plurality of products, as ranked, in the additional search results.

17. A system comprising:

one or more processors; and one or more non-transitory storage devices storing computing instructions configured to run on the one or more processors and perform acts of:

receiving a plurality of search queries from one or more users;

coordinating displaying of respective search results for each respective search query of the plurality of search queries, the respective search results for each respective search query of the plurality of search queries comprising at least one respective product of a plurality of products;

receiving an indication that the one or more users selected one or more respective products of the plurality of products in the respective search results for each respective search query of the plurality of search queries;

associating each respective search query of the plurality of search queries with a respective product type based on the one or more respective products of the plurality of products selected by the one or more users in the respective search results;

identifying one or more respective product attributes of a plurality of product attributes in each respective search query of the plurality of search queries;

while the system is identifying the one or more respective product attributes of the plurality of product attributes:

maintaining, in real time, a count of a number of times each respective product attribute of the one or more respective product attributes of the plurality of product attributes are identified in the plurality of search queries;

determining a respective attribute weight for each respective product attribute of the plurality of product attributes for the respective product type based on the count of the number of times each respective product attribute of the plurality of product attributes was identified in each respective search query of the plurality of search queries;

determining which product attributes of the plurality of product attributes are recorded in respective product information for each respective product of the plurality of products;

determining a respective product attribute score for each respective product of the plurality of products by combining the respective attribute weight for all respective product attributes of the plurality of product attributes recorded in the respective product information for each respective product of the plurality of products;

ranking the plurality of product attributes from a largest respective attribute weight to a smallest respective attribute weight based on the respective attribute weight for each respective product attribute of the plurality of product attributes; and coordinating displaying of a portion of the plurality of product attributes, as ranked, on a first webpage with a respective plurality of unique attributes displayed with each respective product attribute of the portion of the plurality of product attributes, wherein selection of one or more respective unique attributes of the respective plurality of unique attributes on the first webpage filters a first portion of the plurality of products displayed on the first webpage.

18. The system of claim 17, wherein the one or more non-transitory storage devices storing the computing instructions are further configured to run on the one or more processors and perform acts of:

receiving an additional search query;

selecting a second portion of the plurality of products for display in additional search results for the additional search query, wherein the respective product attribute score of each respective product of the second portion of the plurality of products is higher than the respective product attribute score for each respective product of a third portion of the plurality of products not selected for display in the additional search results for the additional search query; and coordinating displaying of the second portion of the plurality of products in the additional search results.

19. The system of claim 18, wherein:

the one or more non-transitory storage devices storing the computing instructions are further configured to run on the one or more processors and perform acts of:

normalizing the respective attribute weight for each respective product attribute of the plurality of product attributes for the respective product type such that a combined total of all respective attribute weights for the respective product type is equal to 1; and ranking the second portion of the plurality of products from a highest respective product attribute score to a lowest respective product attribute score based on the respective product attribute score for each respective product of the second portion of the plurality of products;

determining the respective product attribute score for each respective product of the plurality of products comprises determining the respective product attribute score for each respective product of the plurality of products by combining the respective attribute weight, as normalized, for all respective product attributes of the plurality of product attributes recorded in the respective product information for each respective product of the plurality of products; and coordinating displaying of the second portion of the plurality of products in the additional search results comprises coordinating displaying of the second portion of the plurality of products, as ranked, in the additional search results.

20. The system of claim 17, wherein the one or more non-transitory storage devices storing the computing instructions are further configured to run on the one or more processors and perform an act of:

coordinating displaying of a second webpage for a product of the plurality of products, the second webpage comprising a highlighted product attribute for a product attribute of the plurality of product attributes for the product, the highlighted product attribute for the product attribute of the plurality of product attributes for the product comprising a largest respective attribute weight relative to respective attribute weights of other respective product attributes of the plurality of product attributes for the product.

* * * * *